(12) United States Patent
Boyd et al.

(10) Patent No.: US 12,314,108 B2
(45) Date of Patent: May 27, 2025

(54) UTILIZING POWER-DRAW DEVICE SIGNALS TO IMPROVE THE RECOVERY OF VIRTUAL MACHINE HOST DEVICES

(71) Applicant: Microsoft Technology Licensing, LLC, Redmond, WA (US)

(72) Inventors: Emma Sutherland Boyd, Richmond, VA (US); Shekhar Agrawal, Kirkland, WA (US); Amruta Bhalchandra Pathak, Atlanta, GA (US); Yu Yao, Redmond, WA (US); Aravind Narayanan Krishnamoorthy, Bothell, WA (US); Derek James Boyer, Seattle, WA (US); Binit Ranjan Mishra, Kenmore, WA (US); Gaurav Jagtiani, Kirkland, WA (US); Abhay Sudhir Ketkar, Redmond, WA (US); Tri Minh Tran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 18/084,822

(22) Filed: Dec. 20, 2022

(65) Prior Publication Data
US 2024/0201767 A1   Jun. 20, 2024

(51) Int. Cl.
*G06F 11/00* (2006.01)
*G06F 1/30* (2006.01)
(Continued)

(52) U.S. Cl.
CPC ............ *G06F 1/30* (2013.01); *G06F 11/0721* (2013.01); *G06F 11/0793* (2013.01); *G06F 11/3062* (2013.01); *G06F 11/301* (2013.01)

(58) Field of Classification Search
CPC ............ G06F 11/3062; G06F 11/0721; G06F 11/0793; G06F 11/1438; G06F 11/1441; G06F 11/3006; G06F 11/301; G06N 20/00
See application file for complete search history.

(56) References Cited

U.S. PATENT DOCUMENTS 8,549,364 B2   10/2013   Ziskind et al.
9,361,175 B1 *  6/2016   Bose .................... G06F 11/079
(Continued)

OTHER PUBLICATIONS

International Search Report and Written Opinion received for PCT Application No. PCT/US23/083016, Apr. 19, 2024, 16 pages.
(Continued)

*Primary Examiner* — Elmira Mehrmanesh
(74) *Attorney, Agent, or Firm* — Ray Quinney & Nebeker; Christopher Hallstrom

(57) ABSTRACT

The present disclosure relates to utilizing a host failure recovery system to efficiently and accurately determine the health of host devices. For example, the host failure recovery system detects when a host server is failing by utilizing a power failure detection model that determines whether a host server is operating in a healthy power state or an unhealthy power state. In particular, the host failure recovery system utilizes a multi-layer power failure detection model that determines power-draw failure events on a host device. The failure detection model determines, with high confidence, the health of a host device based on power-draw signals and/or usage characteristics of the host device. Additionally, the host failure recovery system can initiate a quick recovery of a failing host device.

20 Claims, 8 Drawing Sheets

(51) Int. Cl.
     *G06F 11/07*          (2006.01)
     *G06F 11/30*          (2006.01)

(56) References Cited

U.S. PATENT DOCUMENTS

| | | | |
|---|---|---|---|
| 9,575,539 B2* | 2/2017 | Kansal | G06F 1/3206 |
| 10,496,150 B2* | 12/2019 | Chen | G06F 9/45558 |
| 2012/0053925 A1 | 3/2012 | Geffin et al. | |
| 2016/0253230 A1* | 9/2016 | Hui | G06F 11/079 |
| | | | 714/47.2 |
| 2017/0199795 A1* | 7/2017 | Allen | G06F 9/4881 |
| 2017/0205863 A1* | 7/2017 | Lee | G06F 1/3206 |
| 2020/0371892 A1 | 11/2020 | Huang | |
| 2021/0034436 A1* | 2/2021 | Tian | G06F 9/45558 |
| 2021/0397238 A1* | 12/2021 | Macasero | G06F 11/324 |

OTHER PUBLICATIONS

Lin, et al., "An Artificial Neural Network Approach to Power Consumption Model Construction for Servers in Cloud Data Centers", IEEE Transactions on sustainable computing, vol. 5, No. 3, Apr. 8, 2019, pp. 329-340.

* cited by examiner

UTILIZING POWER-DRAW DEVICE SIGNALS TO IMPROVE THE RECOVERY OF VIRTUAL MACHINE HOST DEVICES

BACKGROUND

Recent years have seen significant advancements in hardware and software platforms that implement cloud computing systems. Cloud computing systems often make use of different types of virtual services (e.g., virtual machines, computing containers, packages) that provide computing functionality to various devices. These virtual services can be hosted by a group of host servers on a cloud computing system, such as in a server data center.

Despite advances in the area of cloud computing, current cloud computing systems face several technical shortcomings, particularly in the area of recovering failing host servers. To elaborate, host servers are computing devices in a cloud computing system that host one or more virtual machines. Occasionally, a host server begins to fail for one or many reasons. For example, one or more of the virtual machines on the host server stops operating and the host server, while still in operation, stops functioning properly. As another example, the host server has a hardware fault. While in some cases, such as a hardware fault with a specific hardware error, current cloud computing systems can detect and address the failing host server. However, in the majority of cases, current cloud computing systems fail to detect or determine when a host server is failing or has failed in a timely manner.

For instance, many current cloud computing systems often require 15 minutes or more to investigate a potentially failing host server, and even then, these systems operate at around a 50% accuracy rate for correctly identifying a failed host server. This extended downtime is inefficient and negatively impacts both cloud computing systems and clients.

These and other problems, which are covered below, result in inefficiencies and inaccuracies of existing computing systems with respect to host device failure detection and recovery.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
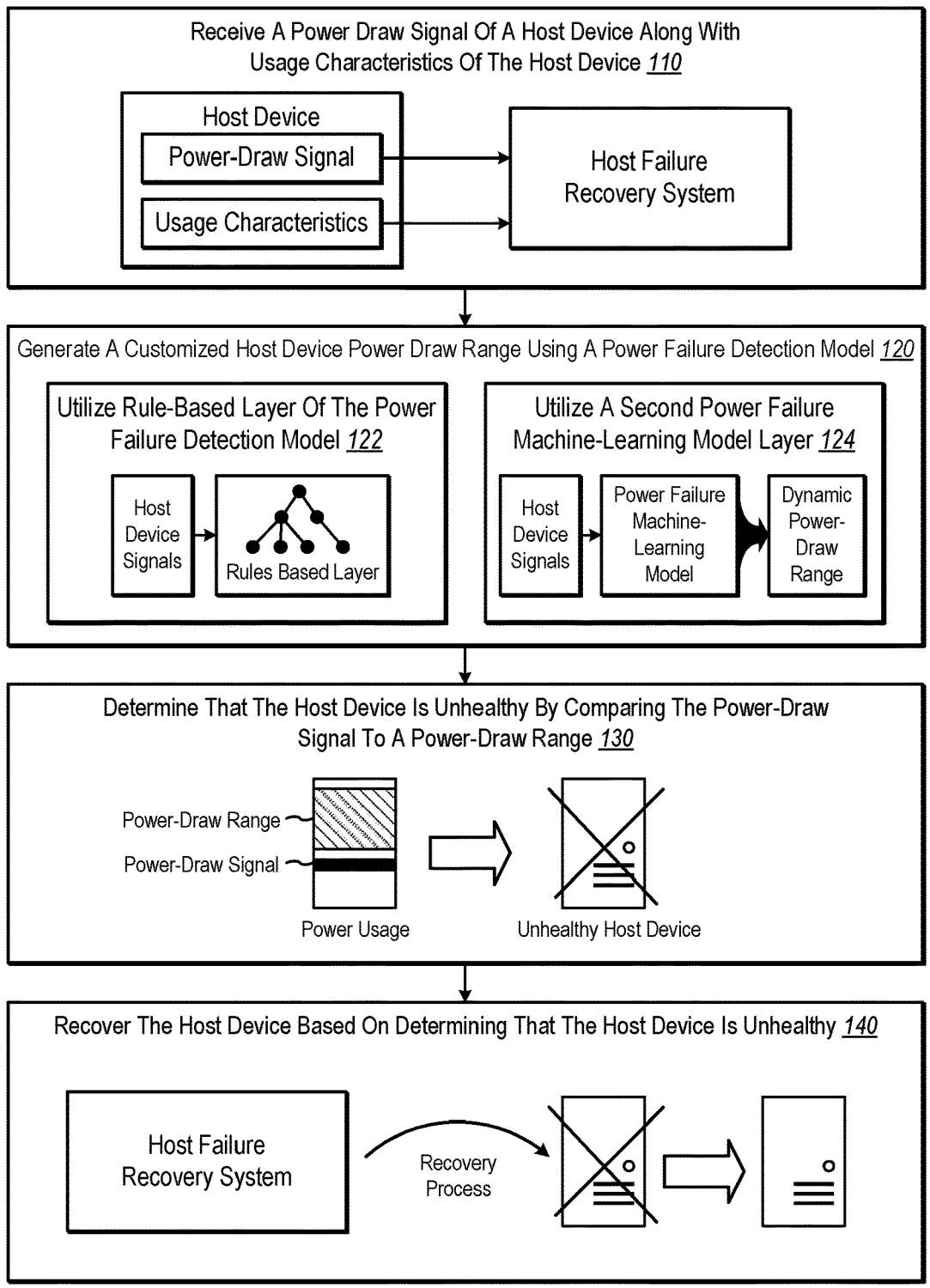
FIG. 1 illustrates an example overview for utilizing a host failure recovery system to efficiently detect and recover failing host devices in accordance with one or more implementations.

This document describes utilizing a host failure recovery system to efficiently and accurately determine the health of host devices. For example, the host failure recovery system detects when a host server is failing by utilizing a power failure detection model that determines whether a host server is operating in a healthy power state ("healthy" for short) or an unhealthy power state ("unhealthy" for short). In particular, the host failure recovery system utilizes a multi-layer power failure detection model that determines power-draw failure events on a host device. The failure detection model determines, with high confidence, the health of a host device based on power-draw signals and/or usage characteristics of the host device. Additionally, the host failure recovery system can initiate a quick recovery of a failing host device.

Indeed, implementations of the present disclosure solve one or more of the problems mentioned above as well as other problems in the art. Systems, computer-readable media, and methods utilizing the host failure recovery system can quickly and accurately detect failing host devices in a cloud computing system and implement a rapid recovery, which significantly reduces downtime of the host server and the cloud computing system.

To illustrate, in one or more implementations, the host failure recovery system uses a power failure detection model to determine that a host device is unhealthy. For example, the host failure recovery system receives, at a management entity, a power-draw signal corresponding to power being drawn by a host system on a host device. Based on the power-draw signals and, in some cases, usage characteristics of the host devices, the failure detection model determines the power-draw failings of host devices. In some instances, the power failure detection model includes a first rules-based layer and a second machine-learning layer having a power failure machine-learning model. In response to determining that the host device is unhealthy, the host failure recovery system initiates recovery of the unhealthy host device from the management entity.

As described in this document, the host failure recovery system provides several technical benefits with respect to image dataset generation when compared to existing computing systems. Indeed, the host failure recovery system provides several practical applications that deliver benefits and/or solve problems by adding accuracy and efficiency to the power-draw failure and recovery process of host devices in a cloud computing system. Some of these technical benefits and practical applications are discussed below as well as through this document.

As noted above, existing computer systems suffer from extended downtimes of host devices, which lead to service outages and lost processing opportunities and functionality. To elaborate, some existing computer systems rely on a binary signal that tracks "heartbeats" to determine if a host device is potentially failing. For example, an agent on a host device provides a regular heartbeat (e.g., at regular intervals) and if a heartbeat is missed, the existing computer systems start diagnosing the host device to determine if failure mitigation action is needed. When an issue is potentially identified, existing computer systems will first wait for a waiting period (e.g., commonly a 15-minute waiting period) before implementing mitigation actions because these existing computer systems lack the ability to make up-to-date, high-confidence determinations regarding the health of a host device.

In contrast, the host failure recovery system performs several actions to both overcome and improve upon these problems. As explained below, the host failure recovery system significantly reduces the time needed to detect unhealthy host devices as well as improves the accuracy of detecting unhealthy host devices. Indeed, where existing computer systems would take up to 15 minutes to identify an unhealthy host device with a 50% accuracy rate or confidence rate, the host failure recovery system identifies unhealthy host devices two to three times faster (e.g., within 5-8 mins), and at a 95% confidence rate.

To further elaborate, the power failure detection model provides the benefits of both increased accuracy and efficiency over existing computer systems. For instance, the power failure detection model more quickly determines the health of a host device based on the real-time monitoring of the power draw of a host device and, in some instances, the usage characteristics of the host device utilizing the power failure detection model. In this manner, the host failure recovery system more quickly determines when host devices are unhealthy and repairs them to negate extended downtimes.

To illustrate by way of example, by utilizing a two-layer power failure detection model, the host failure recovery system efficiently and accurately processes simple and complex signals corresponding to the power draw of a host device to determine when the host device is unhealthy and needs to be repaired. For instance, the host failure recovery system utilizes a first rule-based layer in the power failure detection model that utilizes heuristics to quickly detect more common failure signal patterns of host devices.

Additionally, the host failure recovery system utilizes a second machine-learning layer, often having a power failure machine-learning model that accurately determines when a host server is unhealthy based on complex and/or less common failure signal patterns, such as combinations of usage characteristics of a host device. In various implementations, the usage characteristics of a host device include hardware information, software information, and/or workload information. Accordingly, the host failure recovery system determines unhealthy host devices with higher confidence and accuracy (e.g., often over 90-95% confidence rates) than existing computer systems.

As another benefit, because of the higher accuracy in detecting failing host devices, the host failure recovery system does not need to wait a waiting period (e.g., 15-minutes or longer) to verify if the host server is really failing or just under/over-leveraged. Indeed, in some instances, the host failure recovery system determines in real-time whether a host server is unhealthy and should be repaired.

Further, in various implementations, the host failure recovery system trains the power-failure machine-learning model, which operates in the second layer of the power failure detection model. In these implementations, by training the power-failure machine-learning model, the host failure recovery system ensures that the power-failure machine-learning model accurately and robustly generates dynamic power-draw ranges corresponding to a power usage range a host device is projected to consume based on its usage characteristics.

As illustrated in the foregoing discussion, this document utilizes a variety of terms to describe the features and advantages of one or more implementations described in this document. These terms are defined below as well as used throughout the document in different examples and contexts.

To illustrate, as an example of a term used in this document, the term "cloud computing system" refers to a network of connected computing devices that provide various services to client devices. For instance, a cloud computing system can be a distributed computing system that includes a collection of physical server devices (e.g., server nodes) organized in a hierarchical structure including computing zones, clusters, virtual local area networks (VLANs), racks, load balancers, fault domains, etc. In addition, features and functionality described in connection with cloud computing systems can similarly relate to racks, fault domains, or other hierarchical structures of physical server devices. The cloud computing system may refer to a private or public cloud computing system.

In some implementations, a cloud computing system includes a management entity or orchestrator that manages servers (e.g., server clusters, server racks, server nodes, and/or other server groups of computing devices). In many instances, a management entity manages one or more host devices. For example, in this document, the term "host device" refers to a server device that includes one or more virtual machines. In some instances, a host device can include memory and other computing components and systems, such as a host system and an axillary system. In addition, a host device also includes a host operating system and additional components, as provided below in connection with FIG. 2B.

As another example, as used in this document, a "virtual machine" refers to an emulation of a computer system on a server node that provides the functionality of one or more applications on the cloud computing system. In various implementations, a host device allocates computing cores and/or memory to virtual machines running on the host device. Virtual machines can provide the functionality needed to execute one or more operating systems.

For example, the term "power draw" refers to the power or electric energy consumption at a given time instance or across a given time period. In various instances, power draw is measured in watts or joules over time. Often a power monitoring device measures the power draw of a computing device. In some implementations, the power monitoring device and/or another component generates a power-draw signal to indicate the measured power draw of a computing device at a given time instance or period.

As an additional example, as used in this document, "usage characteristics" (with reference to a computing device) refer to information corresponding to characteristics, attributes, settings, and/or features of the computing device. For example, as further described below, usage characteristics of a host device include hardware information (e.g., physical capabilities of the host device), software information (e.g., programs, instructions, and configurations of the host device), and workload information (e.g., operations assigned to and/or running on the host device). Usage characteristics may include additional information corresponding to a host device. In various implementations, the host failure recovery system utilizes usage characteristics to determine power-draw ranges customized for specific host devices based on their current settings.

In various implementations, the host failure recovery system utilizes a power failure detection model to determine the health of host devices in a cloud computing system. For example, in this document, a "power failure detection model" includes a model that determines power-draw failings of host devices based on power-draw signals. In some cases, a power failure detection model includes multiple layers, such as a first rule-based layer and a second machine-learning layer having a power failure machine-learning model. Examples of power failure detection models are provided below in connection with the figures.

As another example, as used in this document, the terms "healthy" and "unhealthy" refers to power or functional states of a host device. For example, the term "healthy" indicates proper usage and consumption of a host device, such as a healthy power state given the operations being performed by the host device. A host device is "unhealthy" when some or all of the host devices become unresponsive, utilizes too much power, or utilizes not enough power. For example, a host device that has one or more non-responsive or underperforming virtual machines is unhealthy. The host failure recovery system can recover and/or repair an unhealthy host device through a recovery process.

For example, as used in this document, the term "recovery process" refers to improving the health of a host server by repairing one or more elements of the host device. For instance, a management entity provides instructions in-band or out-of-band (e.g., via an auxiliary service controller) to the host device to perform one or more processes to improve the health of the host device. In some implementations, the recovery process includes restarting one or more virtual machines or applications running on the host device. In some implementations, the recovery process includes moving one or more virtual machines to another host device. In some implementations, the recovery process includes rebooting or restarting the host device.

As an additional example, as used in this document, the term "machine-learning model" refers to a computer model or computer representation that can be tuned (e.g., trained) based on inputs to approximate unknown functions. For instance, a machine-learning model can include, but is not limited to, a transformer model, a sequence-to-sequence model, a neural network (e.g., a convolutional neural network or deep learning model), a decision tree (e.g., a gradient-boosted decision tree), a quantile regression model, a linear regression model, a logistic regression model, a random forest model, a clustering model, support vector learning, Bayesian network, regression-based model, principal component analysis, or a combination of the above. As used herein, the term "machine-learning model" includes deep-learning models and/or shallow learning models.

Additional details will now be provided regarding the host failure recovery system. To illustrate, FIG. 1 shows an example overview for utilizing a host failure recovery system to efficiently detect and recover failing host devices in accordance with one or more implementations. As shown, FIG. 1 illustrates a series of acts 100, where one or more of the acts can be performed by the host failure recovery system.

As shown in FIG. 1, the series of acts 100 includes an act 110 of receiving a power-draw signal of a host device along with usage characteristics of the host device. In various implementations, the host failure recovery system operates on a management entity or management device within a cloud computing system, where the management entity manages a group of host devices and where the host failure recovery system monitors the health of a group of host devices.

As part of monitoring the health of host devices, the host failure recovery system receives device signals from the host devices. For example, the host failure recovery system receives a power-draw signal from a host device. In addition, the host failure recovery system also receives usage characteristics corresponding to the host device, such as hardware information, software information, and/or workload information. Additional details regarding host device signals are provided below in connection with FIGS. 2A-2B and FIGS. 3A-3B.

As shown, the series of acts 100 includes an act 120 of generating a power-draw range using a power failure detection model. In many implementations, the host failure recovery system utilizes a power failure detection model that includes two layers corresponding to different device health measurement tools. For example, in one or more implementations, a power failure detection model includes a first layer that is rule-based and a second layer that is machine-learning model-based. In these implementations, the host failure recovery system utilizes the first layer when possible.

To illustrate, the act 120 includes a sub-act 122 of utilizing a rule-based layer of the power failure detection model. For example, in various implementations, the rule-based layer determines if the host device signals match the signal patterns of one or more device failure rules. If so, the host failure recovery system utilizes the rules to obtain and/or identify a power-draw range for the host device. Otherwise, the host failure recovery system provides some or all of the host device signals to the second layer. Additional details regarding the rule-based layer of the power failure detection model are provided below in connection with FIGS. 3A-3B.

As shown, the act 120 includes a sub-act 124 of utilizing a power failure detection machine-learning model of the power failure detection model. In some implementations, the power failure detection model includes a power failure detection machine-learning model, which generates a dynamic processing range (e.g., power range) based on host device signals, such as the usage characteristics of the host device. In one or more implementations, the host failure recovery system utilizes a power failure detection model to generate a power-draw range customized from the host device and its specific characteristics.

As noted above, the host failure recovery system utilizes this second layer of the power failure detection model to determine a power usage range of a host device (e.g., an upper/maximum and lower/minimum power threshold) given its current capabilities and assigned operations. Additional details regarding the power failure detection machine-learning model are provided below in connection with FIGS. 3A-3B as well as FIG. 4.

As shown, the series of acts 100 includes an act 130 of determining that the host device is unhealthy by comparing the power-draw signal to a power-draw threshold. For instance, in various implementations, the host failure recovery system compares a current power-draw signal to a power-draw range or a threshold (e.g., at the top or bottom of the range). When the host device has a power draw that is outside of the power-draw range, the host failure recovery system determines the host device to be unhealthy. Additional details regarding determining that a host device is unhealthy are provided below in connection with FIGS. 3A-3B.

Further, the series of acts 100 includes an act 140 of recovering the host device based on determining that the host device is unhealthy. In various implementations, based on determining that the host device is unhealthy, the host failure recovery system on the management entity initiates a recovery process, as described above, to recover the host device. In this manner, the host failure recovery system quickly and accurately discovers unhealthy host devices and repairs them before an extended timeout occurs. Additional details regarding repairing an unhealthy host device are provided below in connection with FIG. 3B.

Figure 2A:
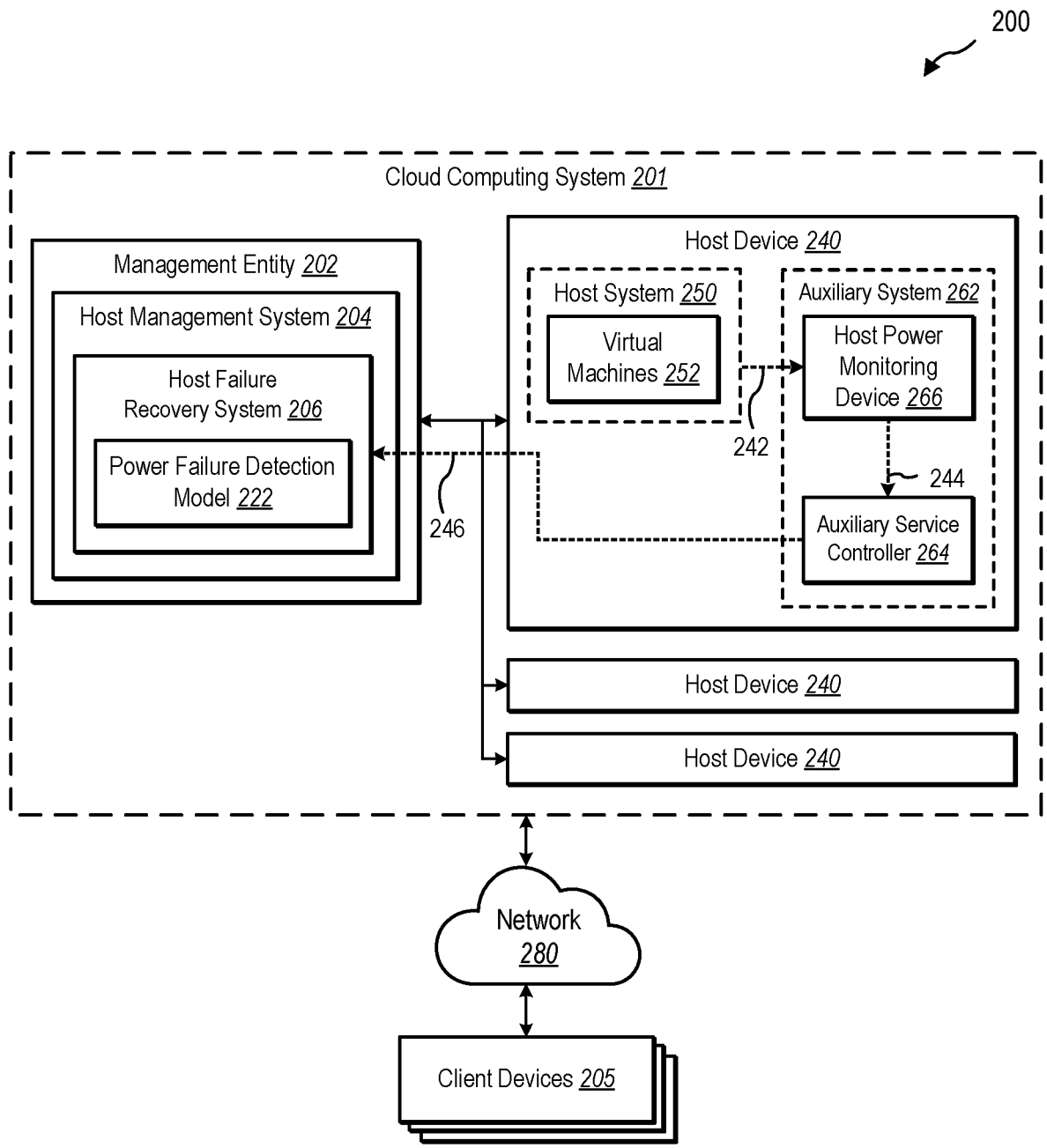
FIGS. 2A-2B illustrate example diagrams of a computing system environment where a host failure recovery system is implemented in accordance with one or more implementations.
Figure 2B:
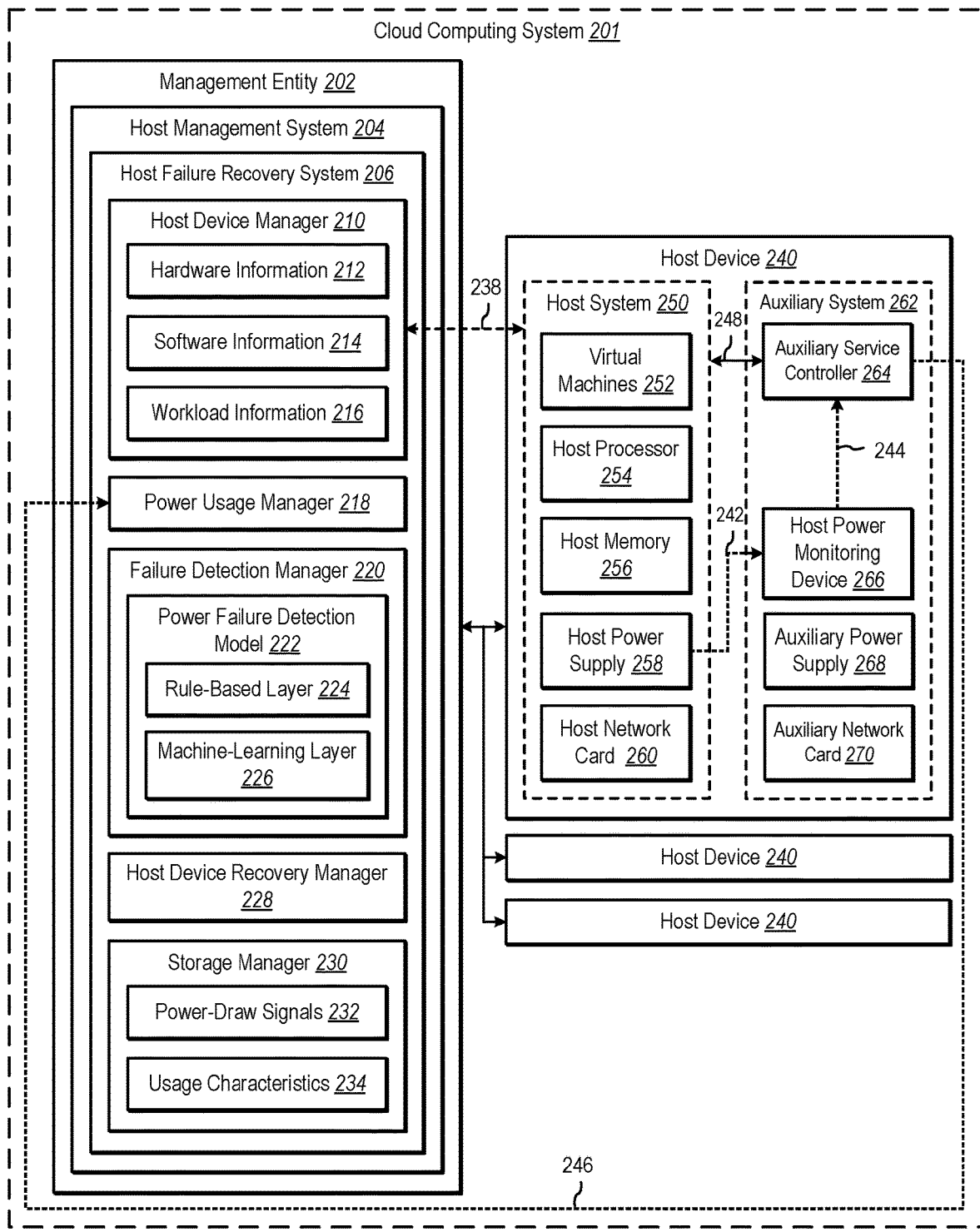

As mentioned above, FIGS. 2A-2B provides additional details regarding the host failure recovery system. For example, FIGS. 2A-2B illustrate example diagrams of a computing system environment where a host failure recovery system 206 is implemented in accordance with one or more implementations. In particular, FIG. 2A introduces example environmental components associated with a host failure recovery system. Additionally, FIG. 2B includes various details regarding components and elements that help to explain the functions, operations, and actions of a host failure recovery system 206.

As shown, FIG. 2A includes a schematic diagram of an environment 200 (e.g., a digital medium system environment) for implementing a host failure recovery system 206. The environment 200, as shown, includes a cloud computing system 201 and client devices 205 connected via a network 280. The cloud computing system 201 includes various computing devices and components. Additional details regarding computing devices are provided below in connection with FIG. 6.

In various implementations, the cloud computing system 201 is associated with a data center. For example, the cloud computing system 201 provides various services to the client devices 205. The cloud computing system 201 includes components that may be located in the same physical location or that may be spread over multiple geographic locations.

As shown, the cloud computing system 201 includes a management entity 202 and multiple host computing devices (e.g., host devices 240). For simplicity, only one host device is shown with internal components, but each of the host devices 240 may include the same or similar components. Additionally, the management entity 202 and the host devices may be implemented on one or more server devices or other computing devices.

The management entity 202 shown in the cloud computing system 201 includes a host management system 204 having the host failure recovery system 206. In various implementations, the host management system 204 manages one or more of the host devices 240. For example, the host management system 204 allocates operations, jobs, and/or tasks to one or more of the host devices 240 to be executed on one or more virtual machines. In various implementations, the host management system 204 tracks usage information of the host devices 240, such as the hardware capabilities of each device, software versions and configurations, and/or workload assignments and progress. The host management system 204 can also perform other management tasks corresponding to the host devices 240 as well as management tasks corresponding to managing the cloud computing system 201.

As mentioned above, the host management system 204 includes the host failure recovery system 206. As described in this document, the host failure recovery system 206 detects when host devices 240 are failing and takes mitigating actions. As shown in FIG. 2A, the host failure recovery system 206 includes a power failure detection model 222. In various implementations, the host failure recovery system 206 utilizes the power failure detection model 222 to determine when a host device is failing based on power-draw signals (e.g., current power usage). Additional details regarding components of the host failure recovery system 206 and the power failure detection model 222 are provided in connection with FIG. 2B.

As a note, this document describes using power-draw signals to determine failing host devices. In some implementations, the host failure recovery system 206 determines failing host devices based on different metrics. For example, rather than a power draw, the host failure recovery system 206 tracks network bandwidth usage and/or network packets to determine failing host devices (e.g., based on a range of projected packets that should be communicated by a host device. Indeed, the host failure recovery system 206 may generate and/or use a packet failure detection model in a similar manner as the power failure detection model 222 described in this document to determine when host devices are failing.

As shown, the host devices 240 include a host system 250 and an auxiliary system 262. In various implementations, the host system 250 and the auxiliary system 262 are separate systems on the same computing device. For example, the host system 250 is a first computer system with its own processor and memory (e.g., one or more host processors and host memory), network connection, and/or power supply, while the auxiliary system 262 is a second computing system on the same computing device (e.g., sharing the same motherboard) and has its own components (e.g., a secondary processor, memory, network connection, power supply). In some instances, the host system 250 and the auxiliary system 262 intercommunicate and/or share components (e.g., one system includes shared memory accessible by the other system).

As shown, the host system 250 includes virtual machines 252. For example, each of the host devices 240 includes one or more virtual machines, computing containers, and/or other types of virtual services (or the capabilities to implement these functions). The host devices 240 may include additional components, such as those shown in FIG. 2B and further described below.

As also shown, the auxiliary system 262 includes an auxiliary service controller 264 and a host power monitoring device 266. In various implementations, the auxiliary service controller 264 is a specialized microcontroller within a host device, separate from a host processor or the host system 250. For example, in many implementations, the auxiliary service controller 264 includes its own processor and its own memory. In various implementations, the auxiliary service controller 264 is a baseband management controller (BMC).

In various implementations, the auxiliary system 262 monitors the power draw (and/or other functions) of the host system 250. For example, the host power monitoring device 266 on the auxiliary system 262 (or located elsewhere within the host device) measures a host system power draw 242 being used by the host system 250. As shown, the host power monitoring device 266 reports the measured host system power draw 244 to the auxiliary service controller 264, which passes the reported host system power draw 246 to the host failure recovery system 206. While the host system power draw 242, the measured host system power draw 244, and the reported host system power draw 246 are described as separate signals, in various implementations, they are the same signal or versions of the same single.

As further shown in FIG. 2A, the environment 200 includes client devices 205, which communicate with the cloud computing system 201 via the network 280. The client devices 205 may represent various types of computing devices, including mobile devices, desktop computers, or other types of computing devices. For example, a client device accesses services provided by one or more of the virtual machines 252 on a host device of the cloud computing system 201.

In addition, the network 280 may include one or multiple networks that use one or more communication platforms or technologies for transmitting data. For example, the network 280 may include the Internet or other data link that enables the transport of electronic data between respective client devices and devices of the cloud computing system 201. Additional details regarding these computing devices and networks are provided below in connection with FIG. 6.

As mentioned above, FIG. 2B includes additional components within the management entity 202 and the host devices 240 of the cloud computing system 201. Along with these additional components, FIG. 2B provides additional details regarding the functions, operations, and actions of a host failure recovery system 206.

To illustrate, the host devices 240 show the host system 250 and the auxiliary system 262 each having additional components. For example, the host system 250 includes the virtual machines 252 introduced above as well as a host processor 254, host memory 256, a host power supply 258, and a host network card 260. Additionally, the auxiliary system 262 includes the auxiliary service controller 264 and the host power monitoring device 266 introduced before as well as an auxiliary power supply 268 and an auxiliary network card 270, which are separate from the host power supply 258 and the host network card 260.

In various implementations, the management entity 202 performs one set of interactions with the host system 250 and another set of interactions with the host devices 240. For example, the management entity 202 communicates with the host system 250 via the host network card 260 to allocate jobs, provide data for processing, receive status updates, and/or receive processed information. Additionally, the management entity 202 interacts with the auxiliary system 262 to monitor the health and status of the host system 250 and host devices 240. For example, the management entity 202 communicates with the auxiliary system 262 via the auxiliary network card 270. In this manner, the management entity 202 can monitor the status of the host system 250 even if communications with the host system 250 fail or are interrupted. In some implementations, the host system 250 and the auxiliary system 262 share the same network connection.

As mentioned, the host system 250 and the auxiliary system 262 include separate power supplies. This enables the auxiliary system 262 to be unaffected by power failures or interruptions to the host system 250 (or vice versa). Additionally, in some instances, this allows the host power monitoring device 266 on the auxiliary system 262 to accurately monitor the power usage (e.g., power draw) of the host system 250 independent of power being used by the auxiliary system 262 on the host device. In some instances, however, the host system 250 and the auxiliary system 262 share the same power supply. In these implementations, when providing the reported host system power draw 246 of the host system 250 (or the host processor 254) to the management entity 202, the auxiliary service controller 264 may discount or disregard its own power usage when reporting the power draw of the host system 250 or just provide the total power usage of the host device.

Additionally, the host management system 204 within the management entity 202 includes various additional components and elements. For example, the host management system 204 includes a host device manager 210, a power usage manager 218, a host device recovery manager 228, and a storage manager 230. As shown, the host device manager 210 includes example elements corresponding to information of the host devices 240, such as hardware information 212, software information 214, and workload information 216. The failure detection manager 220 is shown to include the power failure detection model 222, which includes a rule-based layer 224 and a machine-learning layer 226. Additionally, the storage manager 230 includes examples of stored data, such as power-draw signals 232 and usage characteristics 234 of the host devices 240.

As just mentioned, the host management system 204 includes a host device manager 210. In one or more implementations, the host device manager 210 manages and/or monitors one or more aspects of the host device 240. For example, in some cases, the host device manager 210 communicates with the host system 250 (shown as the dashed line 238) to identify, provide, and/or receive usage characteristics 234 or other information associated with an operation of the host system 250. In one or more implementations, the usage characteristics 234 includes hardware information 212, software information 214, and/or workload information 216. In some implementations, the host device manager 210 is located outside of the host failure recovery system 206 and communicates usage characteristics 234 and/or other information about the host device 240/host system 250 to the host failure recovery system 206.

As mentioned, in some instances the host device manager 210 receives hardware information 212 regarding the host device 240. In some cases, the hardware information 212 corresponds to the capability of the host device to process information and/or perform one or more operations associated with the cloud computing system 201. For example, the host device manager 210 identifies information regarding the physical capabilities of the host device 240 and/or host system 250, such as information about the processor, random-access memory (RAM), graphics card, storage devices, power supply, network card, etc., of the host device 240. In some cases, the hardware information 212 is identified based on a stock keeping unit (SKU) of the host device 240 (e.g., the host failure recovery system 206 can identify the hardware information 212 of a host system 250 by utilizing the SKU as in index value in a device inventory lookup table). In some instances, the hardware information 212 is related to the power draw of the host system 250 in that a given configuration of hardware may correspond to an expected power usage or power capability of the host system 250.

As mentioned above, in various implementations the host device manager 210 receives software information 214. For example, the software information 214 may include software versions and/or configuration settings of the host system 250. In general, the software information 214 corresponds to authorizations of the host device 240 to use the hardware for various purposes. In one or more implementations, the software information 214 is related to the hardware information 212 of the host device 240. In this manner, the hardware information 212 and the software information 214 represent capabilities of the host system 250 to perform various functions (and these functions can correspond to a projected or expected power draw amount).

In some instances, software on the host system 250 is configured to allow up to a given number of virtual machines to be deployed on the host system 250. In various instances, the software is configured for virtual machines 252 of a certain type to be deployed on the host system (e.g., search engine indexing or graphics processing) and/or corresponds to the type of operation the virtual machine is authorized to perform. In various implementations, the software information 214 corresponds to an expected power draw of the host system 250 based on the type of software applications being run on the host system 250.

As mentioned above, in some implementations, the host device manager 210 receives workload information 216. In some cases, the workload information 216 includes information related to virtual machines 252 associated with the host system 250. For example, the workload information 216 identifies a number of virtual machines 252 allocated to or operating on the host system 250 and/or functions of the host system 250. In some cases, the workload information 216 identifies a type of each of the virtual machines 252 corresponding to a type of operation that a virtual machine is configured to perform. Some virtual machine operations, such as graphical user interface (GUI) functions are more power intensive than other virtual machine operations, such as web-search functions. In this manner, the number and type of virtual machines 252 included in the workload information 216 correspond to an expected power draw of the host system 250.

In various implementations, the host device manager 210 (and/or the host management system 204) manages and assigns workloads to the host system 250. For example, the host device manager 210 serves as an orchestrator that receives incoming requests and divides request processing among one or more virtual machines and/or host systems.

In some implementations, the host device manager 210 collects hardware information 212, software information 214, and/or workload information 216 as discussed in this document. The host device manager 210 then communicates this information to the storage manager 230 for storage on the host management system 204 as the usage characteristics 234.

As mentioned above, the host management system 204 includes the power usage manager 218. As shown, the power usage manager 218 communicates with the auxiliary service controller 264. For example, the power usage manager 218 receives constant or periodic reported power-draw signals of the reported host system power draw 246 from the auxiliary system 262.

In various implementations, the auxiliary system 262 provides the reported host system power draw 246 via the host device 240 communicating with the management entity 202. In one or more implementations, the host device 240 sends the reported host system power draw 246 to the host failure recovery system 206 on the management entity 202 via the auxiliary network card 270 and/or the host network card 260. In some implementations, the auxiliary service controller 264 has a direct connection with the power usage manager 218, such as through an out-of-band connection.

In some implementations, the reported host system power draw 246 includes a measure of Watts, or Joules over time (e.g., Joules/second), corresponding to a rate at which the host system 250 uses electricity to perform its various function. For example, the reported host system power draw 246 indicates power usage of the host system 250 at a single instant in time. As another example, the reported host system power draw 246 indicates information about the power usage of the host system 250 over an elapsed time or a window of time.

In some implementations, the reported host system power draw 246 includes raw information about the power usage of the host system 250, and the power usage manager 218 further processes and/or interprets the information (e.g., calculates an average power draw over an elapsed time). In various implementations, the auxiliary system 262 may process some or all of the power draw information before communicating it to the power usage manager 218. In some instances, the power usage manager 218 communicates the raw and/or processed versions of the reported host system power draw 246 to the storage manager 230 for storing on the host management system 204 as power-draw signals 232. Accordingly, information associated with the current power usage of the host system 250 is communicated to the host management system 204.

As mentioned above, the host management system 204 includes the failure detection manager 220. In various embodiments, the failure detection manager determines a failure state of the host system 250. For example, the failure detection manager 220 implements a power failure detection model 222 which considers the power-draw signals 232 and/or the usage characteristics 234 to determine whether the host system 250 is healthy. In many implementations, the power failure detection model 222 is a two-layer model including a first, rule-based layer 224. For instance, the rule-based layer 224 considers basic and/or common patterns of the power-draw signals 232 and/or the usage characteristics 234 to resolve whether the host system 250 is healthy.

In cases where the rules-based layer is unable to resolve the health state (e.g., not at all or not with a given confidence value), then the failure detection manager 220 implements the second, machine-learning layer trained to estimate or predict an expected power-draw range for the host system 250 based on the usage characteristics 234 and, in some cases, power-draw signals 232. The failure detection manager 220 determines the state of health of the host system 250 by comparing the power-draw range to the measured power draw (e.g., included in the power-draw signals 232) of the host system 250. The power failure detection model 222 will be discussed in further detail below in connection with FIGS. 3A-3B, and FIG. 4. In this manner, the failure detection manager 220 may determine the health of the host system 250.

As mentioned above, the host management system 204 includes the host device recovery manager 228. In some implementations, the host device recovery manager 228 implements a recovery process based on a failure determination of the failure detection manager 220. For example, based on a determined failure of the host system 250, the host device recovery manager 228 generates a recovery signal to send to the host system 250. In some instances, the host device recovery manager 228 sends the recovery signal directly to the host system 250. In some instances, the host device recovery manager 228 sends the recovery signal to the host system 250 through the auxiliary system 262 (e.g., when the host system 250 is not responding or when the auxiliary system 262 needs to implement restarting or rebooting some or all of the host system 250 and/or the host device 240).

In various implementations, the recovery signal includes instructions to recover or repair the host system 250. For example, the recovery signal includes instructions to restart or reboot the host system 250. As another example, the recovery signal indicates to restart or reboot a portion of the host system 250 (e.g., one or more of the virtual machines 252 operating on the host system 250). Accordingly, in various implementations, the host device recovery manager 228 implements a recovery of the host system 250 once it has failed and the host system 250 follows the instructions for recovery.

The host failure recovery system 206 may monitor, detect, and recover a failed host device, as discussed. In some implementations, the host failure recovery system 206 performs the various features described in this document in an amount of time corresponding to a recovery time. For example, recovery of the host device 240 (e.g., from detection to rebooting) may occur within the recovery time. In some instances, the recovery time is in real time, 30 seconds, 1 minute, 2 minutes, 5 minutes, 8 minutes, 10 minutes, or any other time duration. In this manner, the host failure recovery system 206 may detect and recover a failing device in a shorter amount of time than conventional systems, offering significant improvements.

Although FIGS. 2A-2B illustrate a particular number, type, and arrangement of components within the environment 200 and/or cloud computing system 201, various additional environment configurations and arrangements are possible. For example, either the environment 200 or the cloud computing system 201 can include additional client devices and/or computing devices. In some implementations, the cloud computing system 201 is a single computing device or computer cluster.

Figure 3A:
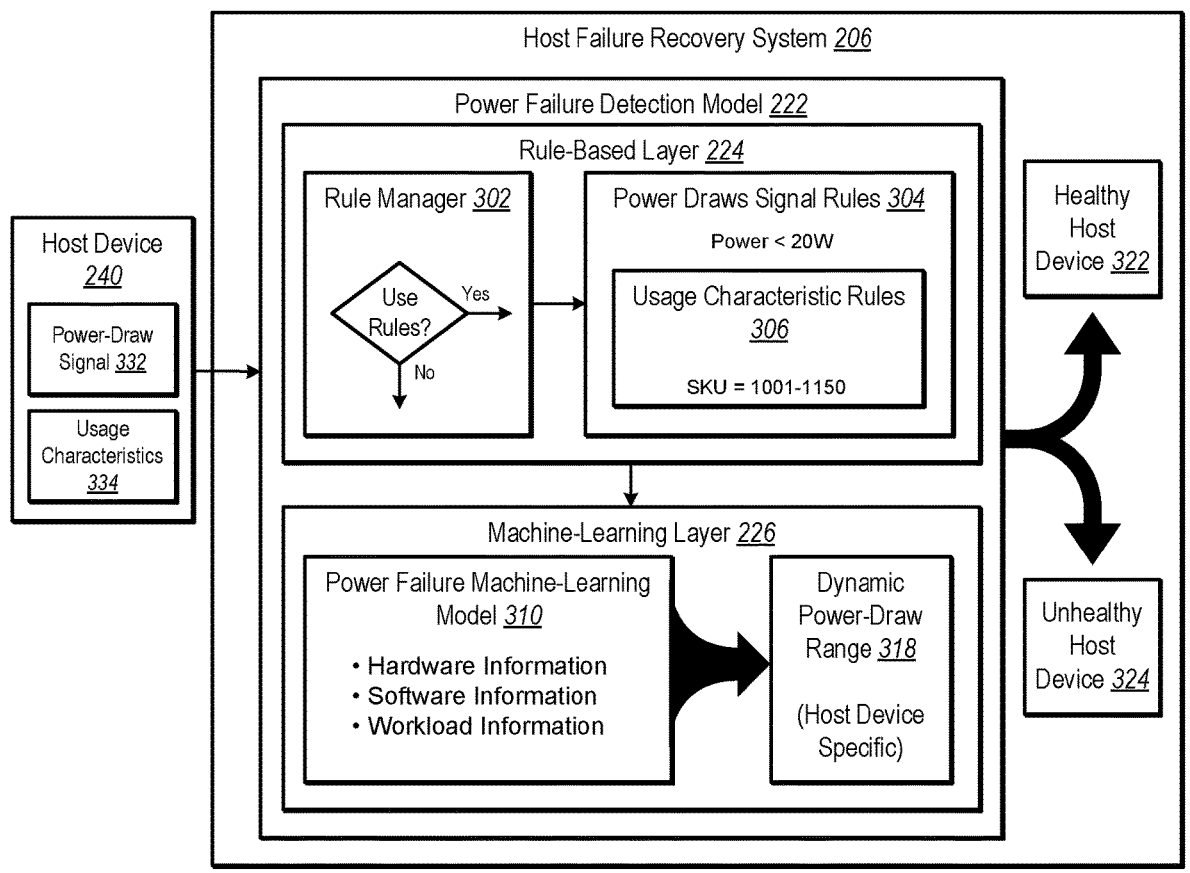
FIGS. 3A-3B illustrate example block diagrams of the host failure recovery system determining the health of host devices in accordance with one or more implementations.
Figure 3B:
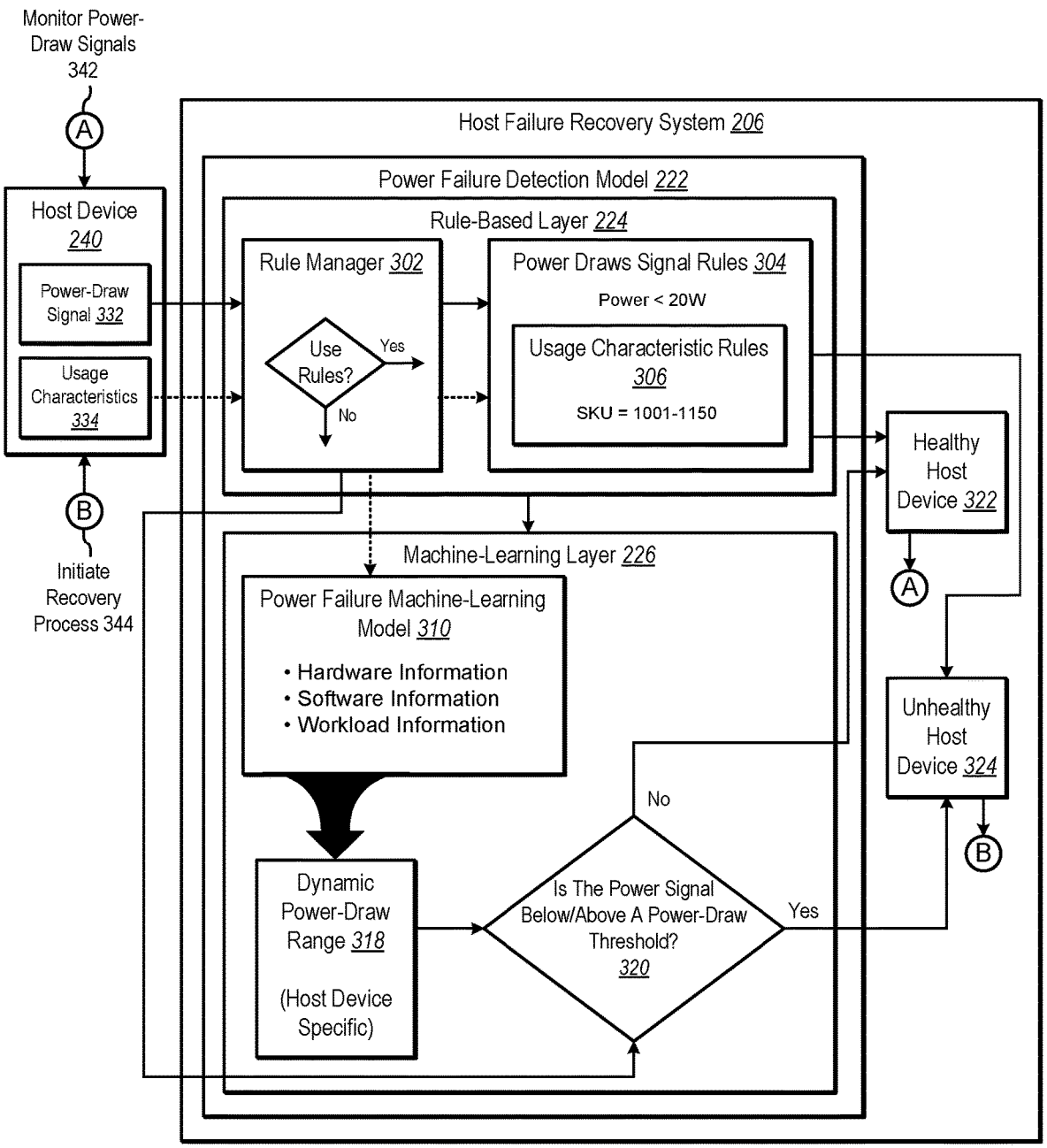

As mentioned above, FIGS. 3A-3B provide additional details regarding host device signals as well as the power failure detection model, including the layers of the model. In particular, FIGS. 3A-3B illustrate example block diagrams of the host failure recovery system determining the health of host devices in accordance with one or more implementations.

To illustrate, the host failure recovery system 206 resolves the failure state of the host system 250 by implementing the power failure detection model 222. In some implementations, the host failure recovery system 206 inputs information collected about the host device 240 to the power failure detection model 222. For example, in various instances, the inputs are power-draw signals 332 and usage characteristics 334, corresponding to the power-draw signals 232 and usage characteristics 234 described above in connection with FIGS. 2A and 2B. Based on the inputs, the power failure detection model 222 produces an output. For example, the host failure recovery system considers the power-draw signals 332 and/or usage characteristics 334 of the host device 240 and outputs a determination of a healthy host device 322 or an unhealthy host device 324.

As discussed above, conventional systems only verify and/or monitor the health of a host device based on a missed heartbeat and may delay up to 15 minutes in initiating recovery operations. In some implementations, the host failure recovery system 206 constantly monitors the power-draw signals 332 and/or the usage characteristics 334 of the host device and uses this information to make a failure state determination at any point in time. In various implementations, the host failure recovery system 206 periodically monitors the health of the host device every 30 seconds, 1 minute, 2 minutes, 5 minutes, 8 minutes, or 10 minutes. In certain implementations, the host failure recovery system 206 also waits for a missed heartbeat or another type of signal. However, the host failure recovery system 206 does not require a further delay in determining if the host device is failing as the host failure recovery system 206 uses the power failure detection model 222 to quickly make this determination, as described below. Indeed, the host failure recovery system 206 can implement the various features described in this document at any desired interval to give a more real-time representation of the health of the host device 240, offering significant improvements over conventional systems.

As discussed herein, the power failure detection model 222 is a two-layer model including a first, rule-based layer 224, and a second, machine-learning layer 226. For example, when implementing the power failure detection model 222, the host failure recovery system 206 first implements the rule-based layer 224. As shown in an example implementation, the rule-based layer 224 includes a rule manager 302 and one or more rules. The rule manager 302 considers the host device inputs and determines whether one or more rules of the rule-based layer 224 apply to the inputs (e.g., whether one of the rules can resolve the health status of the host device 240 based on the inputs). If a rule applies, then the host failure recovery system 206 will continue by implementing one or more rules of the rule-based layer 224 and will not proceed to implement the second, machine-learning layer 226 (e.g., skips the machine-learning layer 226).

In some instances, the rules represent simple and/or commonly observed patterns of the power-draw signals 332 and/or the usage characteristics 234. In these instances, the rules are able to resolve the failing state of the host device 240 with a high confidence such that it is not necessary to implement the more complex, procedurally taxing machine-learning layer 226.

In various implementations, the rule-based layer 224 includes power-draw signal rules 304. For example, in various instances, the power-draw signal rules 304 include a rule that when the observed power draw of the host device 240 is below 20 W (or another power rate). When this rule is satisfied or met, the host device 240 is unhealthy. Indeed, the power-draw signal rules 304 can include various conditional rules that are easily applied to the power-draw signals 332 to determine the health of the host device 240.

In some implementations, the rule-based layer 224 includes usage characteristic rules 306 in addition to the power-draw signal rules 304, as shown in FIG. 3A. For example, certain devices may have hardware configurations with known power draw requirements (e.g., identifiable by SKU), and an operative power draw above or below a threshold power draw may correspond to a rule determination that the host device 240 is unhealthy. For instance, a host device with five active virtual machines should be above 50 W. Thus, the host failure recovery system 206 implements certain high-level rules to dispose of easily resolvable situations with the rule-based layer 224.

The host failure recovery system 206 is able to create and/or implement any number of rules based on any number of host device inputs and combinations thereof to implement the techniques of the rule-based layer 224, as described in this document. In this manner, in various instances, the host failure recovery system 206 determines whether the host device 240 is a healthy host device 322 or an unhealthy host device 324 using the rule-based layer 224 of the power failure detection model 222.

In some implementations, the rule manager 302 considers the host device inputs and determines that the rules of the rule-based layer 224 do not apply to the inputs (e.g., none of the rules can resolve the health state of the host device 240 based on the inputs). In these cases, the host failure recovery system 206 proceeds to implement the second, machine-learning layer 226. For example, the power failure machine-learning model 310 considers the usage characteristics 334 of the host device (i.e., hardware information, software information, and/or workload information) and predicts, estimates, generates, determines, and/or projects an expected power draw for the host device 240.

As shown, the power failure machine-learning model 310 generates a dynamic power-draw range 318. In many implementations, the dynamic power-draw range 318 is customized and/or host device-specific. Indeed, the host failure recovery system 206 utilizes the power failure machine-learning model 310 within the power failure detection model 222 to generate the dynamic power-draw range 318 based on the usage characteristics 334 of the host device 240, as described below in greater detail.

In various implementations, the dynamic power-draw range 318 includes an upper bound (e.g., maximum threshold) and a lower bound (e.g., minimum threshold). In various implementations, the upper bound and lower bound may help to predict the expected power draw to within a desired confidence interval or percentage. For example, in some instances, the dynamic power-draw range 318 predicts the expected power draw with 95% accuracy.

In additional implementations, the power failure machine-learning model 310 generates different dynamic power-draw ranges that correspond to different confidence levels (e.g., a first power-draw range at a lower confidence level has a smaller range than a second power-draw range having a higher confidence level). Accordingly, the machine-learning layer 226 may be implemented to produce a dynamic power-draw range 318 corresponding to an expected power draw of the host device 240 with a given confidence interval.

As discussed in connection with FIG. 4, the machine-learning layer 226 includes a power failure machine-learning model 310 trained to determine a dynamic power-draw range 318. Additionally, any number of usage characteristics can be used in addition to those discussed in this document as a basis for training the power failure machine-learning model 310 and/or generating the dynamic power-draw range 318.

As shown in the act 320 in FIG. 3B, based on determining whether the power signal is below or above a power-draw range (or thresholds), the host failure recovery system 206 determines whether the host device 240 is a healthy host device 322 or an unhealthy host device 324. In particular, the host failure recovery system 206 compares the dynamic power-draw range 318 to the power-draw signal 332 to determine whether the power signal is below or above a power-draw threshold (where the threshold corresponds to the dynamic power-draw range 318). When the power-draw signal 332 is above a maximum threshold or below a minimum threshold of the dynamic power-draw range 318 (shown as the "yes" path), the host failure recovery system 206 determines the host device 240 to be an unhealthy host device 324. Otherwise, the host failure recovery system 206 determines that the host device 240 is a healthy host device 322 when the power-draw signals 332 of the host device 240 is within the dynamic power-draw range 318 (shown as the "no" path).

Indeed, the host failure recovery system 206 implements the second, machine-learning layer 226 of the power failure detection model 222, which generates a dynamic power-draw range 318 specific to the usage characteristics 334 of the host device 240. In this manner, the host failure recovery system 206 is able to determine the health of the host device 240 based on a complex or uncommon combination of usage characteristics 334. More details related to the power failure machine-learning model 310 and related to determining the dynamic power-draw range 318 will be discussed below in connection with FIG. 4.

As mentioned above, in some instances, the host failure recovery system 206 implements the power failure detection model 222 and determines that the host device 240 is unhealthy. In such instances, the host failure recovery system 206 proceeds to implement a recovery process for the host device 240 (e.g., rebooting some or all of the components of the host device 240), such as that discussed above in connection with FIG. 2B. Indeed, the host failure recovery system 206 initiates the recovery process 344, which is shown by linking the two "B" callouts together.

In other instances, the host failure recovery system 206 does not implement any changes to the host device 240 (e.g., delays the recovery process) and continues to monitor the power-draw signals 342 in preparation for a future host device health determination as described in this document, which is shown by the linking the two "A" callouts together.

As mentioned above, in many implementations, the host failure recovery system 206 considers the current state and recent events of the host device 240 when determining whether the host device 240 is failing. For example, the power failure detection model 222 detects a recent power fluctuation event such as the host device 240 recently rebooted. In this case, the host device 240 may signal less power usage than typical (e.g., shutting down) and/or more power usage than typical (e.g., start-up). Indeed, the host failure recovery system 206 can identify one or more routine procedures that are associated with power fluctuation events. In these implementations, the host failure recovery system 206 can delay determining the healthiness or health status of the host device 240 for a period of time. In some implementations, the host failure recovery system 206 provides this information to the power failure machine-learning model 310, which incorporates it as part of generating the dynamic power-draw range 318 customized for the host device 240.

Figure 4:
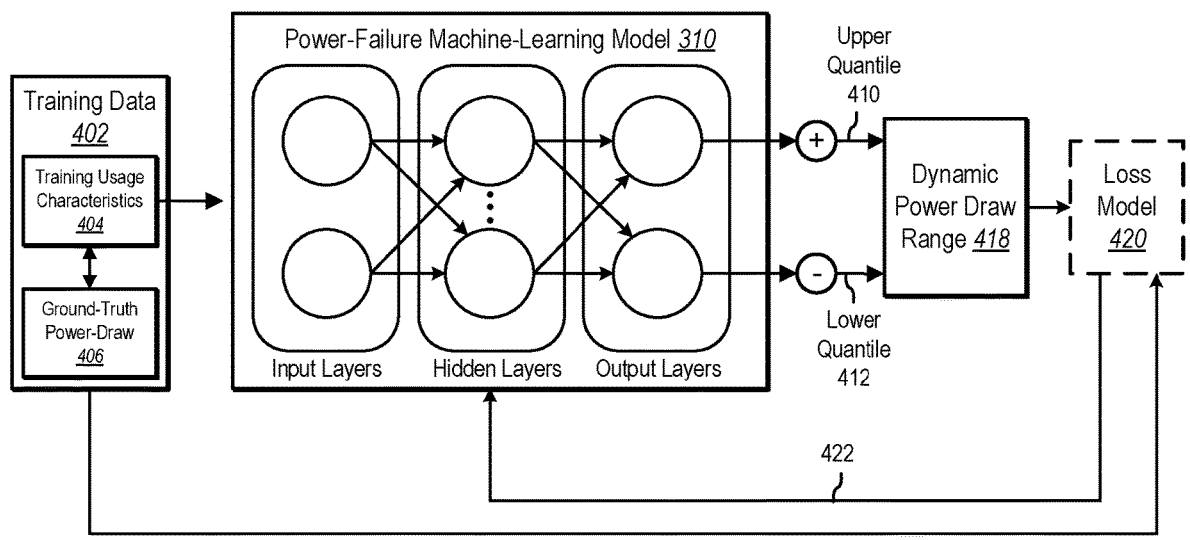
FIG. 4 illustrates an example block diagram for generating a power-failure machine-learning model to efficiently and accurately determine the health of host devices in accordance with one or more implementations.

FIG. 4 illustrates a block diagram of training a power-failure machine-learning model in accordance with one or more implementations. As shown, FIG. 4 includes an example of a power-failure machine-learning model generated by the host failure recovery system 206. In particular, FIG. 4 shows the power failure detection model training a power-failure machine-learning model to detect, classify, and quantify a dynamic power-draw range. In various implementations, the power-failure machine-learning model is implemented by the host failure recovery system 206 on a client device and/or a server device.

As shown, FIG. 4 includes training data 402, a power failure machine-learning model 310, and a loss model 420. The training data 402 includes training usage characteristics 404 and a set of ground-truth power draws 406 corresponding to the training usage characteristics 404. For example, in one or more implementations, the training usage characteristics 404 include hardware information, software information, and workload information for a host device and the ground-truth power draws 406 include power-draw signals of host devices having a corresponding set of training usage characteristics 404. In some implementations, the training data 402 includes different types of usage characteristics and/or corresponding ground truths.

As also shown, FIG. 4 includes the power failure machine-learning model 310. In various implementations, the power failure machine-learning model 310 is a quantile regression model that includes several machine-learning network layers (e.g., neural network layers). For example, in one or more implementations, the power failure machine-learning model 310 includes input layers, hidden layers, and output layers. The power failure machine-learning model 310 can include additional and/or different network layers not currently shown.

As just mentioned, the power failure machine-learning model 310 includes input layers. In some implementations, the input layers encode the training usage characteristics 404 into vector information. For instance, in various implementations, the input layer processes input usage characteristics (e.g., training usage characteristics 404) to encode usage characteristic features corresponding to hardware information, software information, and/or workload information into a numerical representation.

As mentioned above, the power failure machine-learning model 310 includes one or more hidden layers. In one or more implementations, the hidden layers process the feature vectors to find hidden encoded features. In various implementations, the hidden layers map or encode input usage characteristics into feature vectors (i.e., latent object feature maps or latent object feature vectors). In various implementations, the hidden layers generate features from the encoded usage characteristic data from the input layers. For example, in one or more implementations, the hidden layer processes each usage characteristic through various neural network layers to transform, convert, and/or encode data from the input usage characteristic into feature vectors (e.g., a string of numbers in vector space representing the encoded usage characteristic data).

As mentioned above, the power failure machine-learning model 310 includes output layers. In one or more implementations, the output layers process the feature vectors to decode power draw information from the input usage characteristics. For example, the output layer may decode the feature vectors to generate an upper quantile 410 and/or a lower quantile 412 of a power draw corresponding to the input usage characteristics. The upper quantile 410 and the lower quantile 412 define a dynamic power-draw range 418.

As shown, FIG. 4 the host failure recovery system 206 may implement a loss model 420. In some instances, the loss model includes one or more loss functions, and the host failure recovery system 206 implements the loss functions of the loss model 420 to train the power failure machine-learning model 310. For example, the host failure recovery system 206 uses the loss model 420 to determine an error or loss amount corresponding to the dynamic power-draw range 418 that the power failure machine-learning model 310 outputs. For example, the host failure recovery system 206 compares a given ground-truth power draw to a given dynamic power-draw range utilizing the loss model 420 to generate the error or loss amount (where the given dynamic power-draw range is generated by the power failure machine-learning model 310 based on training usage characteristics 404 that correspond to the ground-truth power draws 406 being compared).

In various implementations, the host failure recovery system 206 utilizes the loss amount to train and optimize the neural network layers of the power failure machine-learning model 310 via backpropagation and/or end-to-end learning. For instance, the host failure recovery system 206 back propagates the loss amount via feedback 422 to tune the hidden layers (and/or other layers of the power failure machine-learning model 310). In this manner, host failure recovery system 206 can iteratively tune and train the power failure machine-learning model 310 to learn a set of best-fit parameters that accurately generates the upper quantile 410 and the lower quantile 412 defining the dynamic power-draw range 418.

Figure 5:
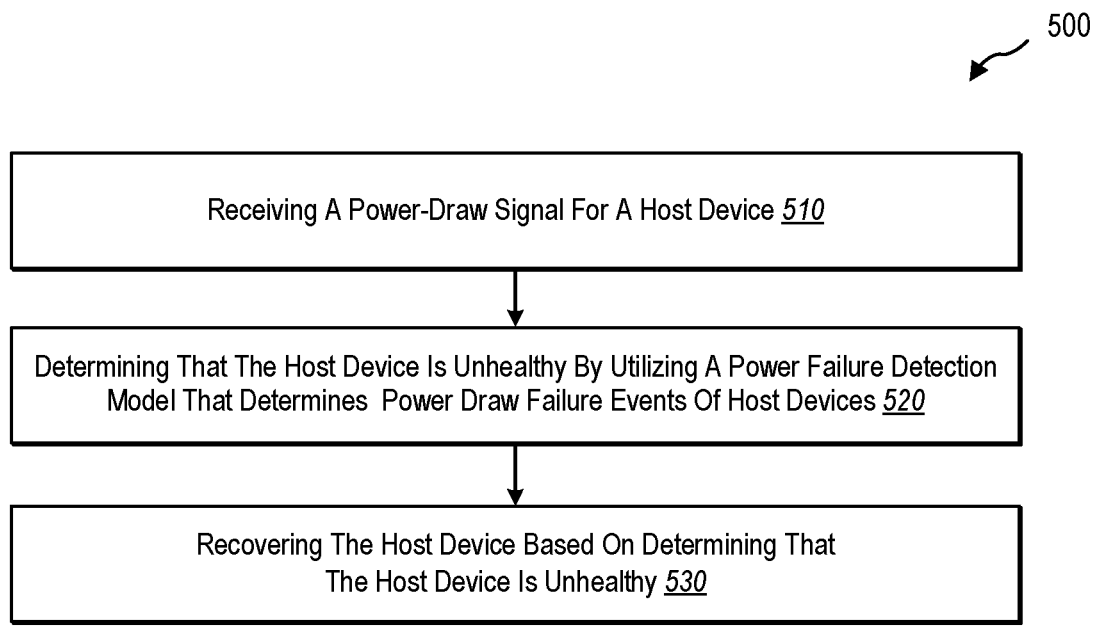
FIG. 5 illustrates an example series of acts for initiating recovery of host devices based on processing power-draw signals of the host devices in accordance with one or more implementations.

Turning now to FIG. 5, this figure illustrates an example flowchart that includes a series of acts for initiating the recovery of host devices based on processing power-draw signals of the host devices in accordance with one or more implementations. While FIG. 5 illustrates acts according to one or more implementations, alternative implementations may omit, add to, reorder, and/or modify any of the acts shown. Further, the acts of FIG. 5 can each be performed as part of a method. Alternatively, a non-transitory computer-readable medium can include instructions that, when executed by at least one processor, cause a computing device to perform the acts of FIG. 5. In still further implementations, a system can perform the acts of FIG. 5.

As shown, the series of acts 500 includes an act 510 of receiving a power-draw signal for a host device. For instance, the act 510 may involve receiving, at a management entity, a power-draw signal corresponding to a power draw by a host system on a host device.

As further shown, the series of acts 500 includes an act 520 of determining that the host device is unhealthy by utilizing a power failure detection model that determines power draw failure events of host devices. For example, the act 520 may involve determining, at the management entity, that the host device is unhealthy using a failure detection model that determines power-draw failings of host devices based on power-draw signals.

As further shown, the series of acts 500 includes an act 530 of recovering the host device based on determining that the host device is unhealthy. For example, the act 530 may include initiating, from the management entity, a recovery process to recover the host device based on determining that the host device is unhealthy.

The series of acts 500 can include additional acts in various implementations. For example, in some implementations, the series of acts 500 includes an act of generating a power failure detection model that includes a first, rule-based layer and a second, machine-learning layer having a power failure machine learning model. In these acts, the power failure detection model determines the power-draw failings of host devices based on power-draw signals and usage characteristics of the host devices. Additionally, the series of acts 500 may include an act of determining whether the host device is unhealthy by comparing the power-draw signal to a power-draw range or threshold determined by the power failure detection model for the host device based on one or more usage characteristics of the host device.

In some implementations, the power failure detection model includes a first, rule-based layer and a second, machine-learning layer, and the series of acts 500 includes an act of determining whether to utilize the first rule-based layer or the second machine-learning layer to determine that the host device is unhealthy based on usage characteristics and the power-draw signal received from the host device. Additionally, in one or more implementations, the acts may include an act of determining to utilize the first rule-based layer based on identifying a rule that corresponds to the power-draw signal from the host device and determining that the host device is unhealthy based on the rule being satisfied by the power-draw signal.

In various implementations, the series of acts 500 includes acts of determining to utilize the second machine-learning layer having a power failure machine-learning model based on failing to identify a rule that corresponds to the power-draw signal of usage characteristics of the host device. Additionally, the acts may include determining a power-draw range for the host device utilizing the power failure machine-learning model for the host device based on the usage characteristics of the host device. Further, the acts may include determining that the host device is unhealthy based on the power-draw signal being outside the power-draw range for the host device.

In one or more implementations, the power-draw signal and the usage characteristics received at the management entity correspond to operations being executed by a host processor of the host system of the host device. Additionally, in some instances, the usage characteristics of the host device include hardware information of the host device, software information of the host device, and/or workload information of the virtual machines running on the host device.

In some implementations, the power-draw signal of the host system is received at the management entity from an auxiliary service controller on the host device, and the host device includes a separate processor and power supply for the auxiliary service controller from the host system. In various cases, the auxiliary service controller determines the power-draw signal utilizing a power measurement device on the host device.

In some instances, the series of acts 500 includes an act of providing recovery instructions to the host system via an auxiliary controller on the host device (e.g., shown as the dashed line 248). Additionally, in various implementations, the series of acts 500 includes an act of providing, from the management entity, recovery instructions to the host device to reboot the host system.

In one or more implementations, the series of acts 500 includes an act of receiving, at the management entity, a second power-draw signal corresponding to a second host system on a second host device. Additionally, the acts may include determining that the second host device is healthy by utilizing the power failure detection model based on the second power-draw signal. Further, in some instances, the acts include delaying the recovery process to recover the second host device based on determining that the second host device is healthy.

In various instances, the power failure detection model determines that the host device is unhealthy based on the power-draw signal of the host device being below a lower power-draw threshold determined by a power failure machine-learning model for the host device. Additionally, in some implementations, the workload information for the usage characteristics of the host device includes a number of operations on the host device and operation types on the host device.

In one or more implementations, the series of acts 500 includes an act of delaying initiating the recovery process based on detecting a mitigation event corresponding to the host device. In some instances, the management entity manages multiple host devices and the host device is one of the multiple host devices. In some cases, the host device and the management entity are located in a data center.

In some instances, the series of acts 500 includes an act of determining not to utilize a first rule-based layer of the power detection model and utilizing a second machine-learning layer of the power detection model to determine that the host device is unhealthy in response to determining not to utilize the first-rule based layer of the power failure detection model. In some instances, the power failure machine-learning model determines that the host device is unhealthy based on the power-draw signal of the host device being below a lower limit of the power-draw range determined by the power failure machine-learning model for the host device. Additionally, in some instances, the power failure machine-learning model determines that the host device is unhealthy based on the power-draw signal of the host device being above an upper limit of the power-draw range determined by the power failure machine-learning model for the host device.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described in this document may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the host failure recovery system 206. Indeed, the networks described in this document may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by at least one processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 6:
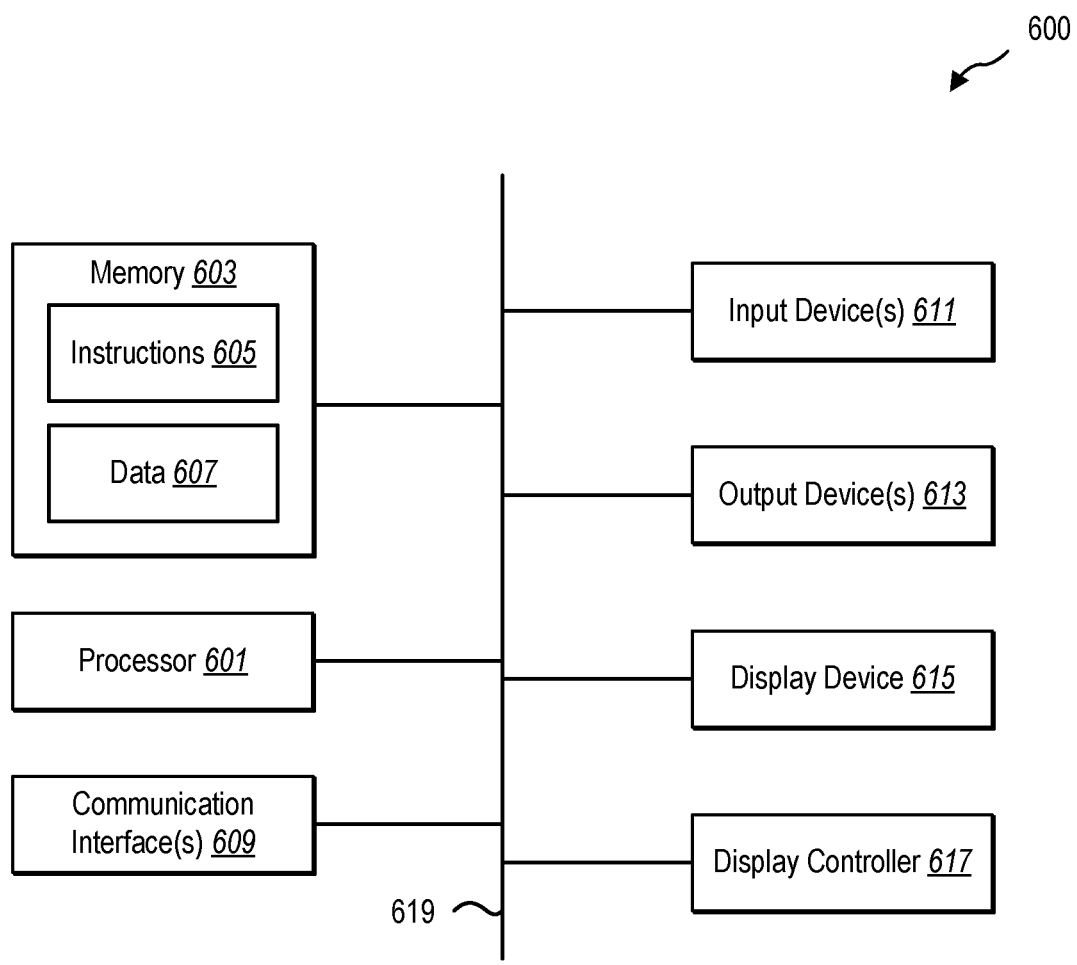
FIG. 6 illustrates certain components that may be included within a computer system.

FIG. 6 illustrates certain components that may be included within a computer system 600. The computer system 600 may be used to implement the various computing devices, components, and systems described in this document.

In various implementations, the computer system 600 may represent one or more of the client devices, server devices, or other computing devices described above. For example, the computer system 600 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 600 includes a processor 601 (i.e., at least one processor). The processor 601 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although the processor 601 shown is just a single processor in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 605 and the data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described in this document may be implemented, partially or wholly, as instructions 605 stored in memory 603 and executed by the processor 601. Any of the various examples of data described in this document may be among the data 607 that is stored in memory 603 and used during the execution of the instructions 605 by the processor 601.

A computer system 600 may also include one or more communication interface(s) 609 for communicating with other electronic devices. The one or more communication interface(s) 609 may be based on wired communication technology, wireless communication technology, or both. Some examples of the one or more communication interface(s) 609 include a Universal Serial Bus (USB), an Ethernet adapter, a wireless adapter that operates in accordance with an Institute of Electrical and Electronics Engineers (IEEE) 602.11 wireless communication protocol, a Bluetooth® wireless communication adapter, and an infrared (IR) communication port.

A computer system 600 may also include one or more input device(s) 611 and one or more output device(s) 613. Some examples of the one or more input device(s) 611 include a keyboard, mouse, microphone, remote control device, button, joystick, trackball, touchpad, and light pen. Some examples of the one or more output device(s) 613 include a speaker and a printer. A specific type of output device that is typically included in a computer system 600 is a display device 615. The display device 615 used with implementations disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network (i.e., computer network), both perform tasks. In a distributed system environment, program modules may be located in both local and remote memory storage devices.

The techniques described in this document may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described in this document. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described in this document may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "including," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described in this document, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer-implemented method, including:
   receiving, at a management entity, a power-draw signal corresponding to a power draw by a host system on a host device;
   generating a power failure detection model that includes a first rule-based layer and a second machine-learning layer having a power failure machine-learning model, wherein the power failure detection model determines power-draw failings of host devices based on power-draw signals and usage characteristics of the host devices;
   determining, at the management entity, that the host device is unhealthy using the power failure detection model; and
   initiating, from the management entity, a recovery process to recover the host device based on determining that the host device is unhealthy by providing recovery instructions to the host device to reboot the host system.

2. The computer-implemented method of claim 1, further comprising determining whether to utilize the first rule-based layer or the second machine-learning layer to determine that the host device is unhealthy based on usage characteristics and the power-draw signal received from the host device.

3. The computer-implemented method of claim 2, further including:
   determining to utilize the first rule-based layer based on identifying a rule that corresponds to the power-draw signal from the host device; and
   determining that the host device is unhealthy based on the rule being satisfied by the power-draw signal.

4. The computer-implemented method of claim 2, further including:
   determining to utilize the second machine-learning layer having a power failure machine-learning model based on failing to identify a rule that corresponds to the power-draw signal or usage characteristics of the host device;
   determining a power-draw range for the host device using the power failure machine-learning model for the host device based on the usage characteristics of the host device; and
   determining that the host device is unhealthy based on the power-draw signal being outside the power-draw range for the host device.

5. The computer-implemented method of claim 4, wherein the power-draw signal and the usage characteristics received at the management entity correspond to operations being executed by a host processor of the host system of the host device.

6. The computer-implemented method of claim 2, wherein the usage characteristics of the host device include hardware information of the host device, software information of the host device, and workload information of virtual machines running on the host device.

7. The computer-implemented method of claim 1, wherein:
   the power-draw signal of the host system is received at the management entity from an auxiliary service controller on the host device; and
   the host device includes a separate processor and power supply for the auxiliary service controller from the host system.

8. The computer-implemented method of claim 7, wherein the auxiliary service controller determines the power-draw signal utilizing a power measurement device on the host device.

9. The computer-implemented method of claim 1, further including providing recovery instructions to the host system via an auxiliary service controller on the host device.

10. The computer-implemented method of claim 1, wherein initiating the recovery process includes providing, from the management entity, recovery instructions to the host device to reboot the host system.

11. The computer-implemented method of claim 1, further including:
   receiving, at the management entity, a second power-draw signal corresponding to a second host system on a second host device;
   determining, at the management entity, that the second host device is healthy by utilizing the power failure detection model based on the second power-draw signal; and
   delaying the recovery process to recover the second host device based on determining that the second host device is healthy.

12. A system including:
   at least one processor at a server device; and
   a computer memory including instructions that, when executed by the at least one processor at the server device, cause the system to carry out operations including:
      receiving, at a management entity, a power-draw signal corresponding to a power draw by a host system on a host device;
      obtaining a power failure detection model that includes a first rule-based layer and a second machine-learning layer having a power failure machine-learning model, wherein the power failure detection model determines power-draw failings of host devices based on power-draw signals and usage characteristics of the host devices;

determining, at the management entity, that the host device is unhealthy using the power failure detection model; and initiating, from the management entity, a recovery process to recover the host device based on determining that the host device is unhealthy by providing recovery instructions to the host device to reboot the host system.

13. The system of claim 12, wherein the power failure detection model determines that the host device is unhealthy based on the power-draw signal of the host device being below a lower power-draw threshold determined by a power failure machine-learning model for the host device.

14. The system of claim 12, wherein workload information from the usage characteristics of the host device includes a number of operations on the host device and operation types on the host device.

15. The system of claim 12, further including instructions that, when executed by the at least one processor, cause the system to carry out additional operations including delaying initiating the recovery process based on detecting a mitigation event corresponding to the host device.

16. The system of claim 12, wherein:
the host device and the management entity are located in a data center; and
the management entity manages multiple host devices, and the host device is one of the multiple host devices.

17. The system of claim 12, further including instructions that, when executed by the at least one processor, cause the system to carry out additional operations including:
determining not to utilize a first rule-based layer of the power failure detection model; and
utilizing a second machine-learning layer of the power failure detection model to determine that the host device is unhealthy in response to determining not to utilize the first rule-based layer of the power failure detection model.

18. A computer-implemented method, including:
receiving, at a management entity, a power-draw signal corresponding to a power draw by a host processor and host memory on a host device;
generating a power failure detection model that includes a first rule-based layer and a second machine-learning layer having a power failure machine-learning model, wherein the power failure detection model determines power-draw failings of host devices based on power-draw signals and usage characteristics of the host devices;
determining, at the management entity, that the host device is unhealthy by comparing the power-draw signal to a power-draw range determined by the power failure detection model for the host device based on one or more usage characteristics of the host device; and
initiating, from the management entity, a recovery process to recover the host device based on determining that the host device is unhealthy by providing recovery instructions to the host device to reboot the host system.

19. The computer-implemented method of claim 18, wherein the power failure machine-learning model determines that the host device is unhealthy based on the power-draw signal of the host device being below a lower threshold of the power-draw range determined by the power failure machine-learning model for the host device.

20. The computer-implemented method of claim 18, wherein the power failure machine-learning model determines that the host device is unhealthy based on the power-draw signal of the host device being above an upper threshold of the power-draw range determined by the power failure machine-learning model for the host device.

* * * * *